INVENTOR
IRVIN D. JOHNSON

United States Patent Office 3,424,002
Patented Jan. 28, 1969

3,424,002
APPARATUS FOR THE DETERMINATION OF LOCATION OF INTERFACES BETWEEN DIFFERENT MATERIALS
Irvin D. Johnson, Littleton, Colo., assignor to Marathon Oil Company, Findlay, Ohio, a corporation of Ohio
Filed June 1, 1965, Ser. No. 460,057
U.S. Cl. 73—290                                17 Claims
Int. Cl. G01f 23/26

ABSTRACT OF THE DISCLOSURE

The present invention comprises processes and methods for determining the position of interfaces between different materials comprising a combination of at least one transmission line passing through said interface, means for generating a fast-rise voltage step which is partially reflected back by any point at which the impedance of said transmission line changes and means for measuring the time interval between generation of a given voltage step and return of its reflection.

---

The present invention relates to new methods for the determination of the positions of interfaces between different materials and in particular relates to methods for the detection of points of change in impedance of transmission lines which pass through such interfaces.

A wide variety of methods for the determination of liquid level are in commercial use or have been proposed. Most of these have some inherent disadvantage such as requirement of complex equipment which is immersed in the fluids and requires excessive maintenance, use of high voltages which involve a spark hazard, excessive sensitivity to changes in ambient temperatures which may cause false readings, or applicability to only certain specialized liquids.

The present invention has none of the above drawbacks and in addition, in multiple installations, permits measuring of a wide variety of fluids with very inexpensive probes having no moving parts. The voltages used for the present invention are preferably in the range of about 15 volts and the probes may be insulated with even considerable thicknesses of insulation to eliminate any possible spark hazard.

The present invention exhibits good stability under fluctuating ambient temperatures and is not limited to the use of any particular fluids but instead is applicable to a wide range of organic fluids including aromatics such as benzene, napthalene, toluene, phenols, kerosenes, and other petroleum fractions, aliphatics such as ethane, propane, butane, pentane, hexane, etc., and their halogenated or otherwise substituted derivatives; and to inorganics including water, carbon tetrachloride, etc.

In addition, the present invention shows the presence of foamed or emulsified interfaces by indicating a gradual increase in impedance at such points. The invention is also applicable with a wide variety of solids including powdered materials, such as sand or fluid petroleum coke; geological strata, sand packs or other porous reservoirs which are flooded with water or other displacement media in order to effect the secondary recovery of petroleum from underground reservoirs; ice; asphalts; etc.

While it is not intended that the present invention be in any way limited to any particular mechanism by which it may operate, it seems clear that the invention utilizes the generation of sharp, very rapidly rising voltage steps which are transmitted along a transmission line which passes through the interface of the fluid or other material, the depth of which is to be measured. The location of the interface is determined by measuring the time interval between the generation of such pulse and the return of a reflection caused by the change of impedance where the transmission line passes through the interface.

Figure 1:
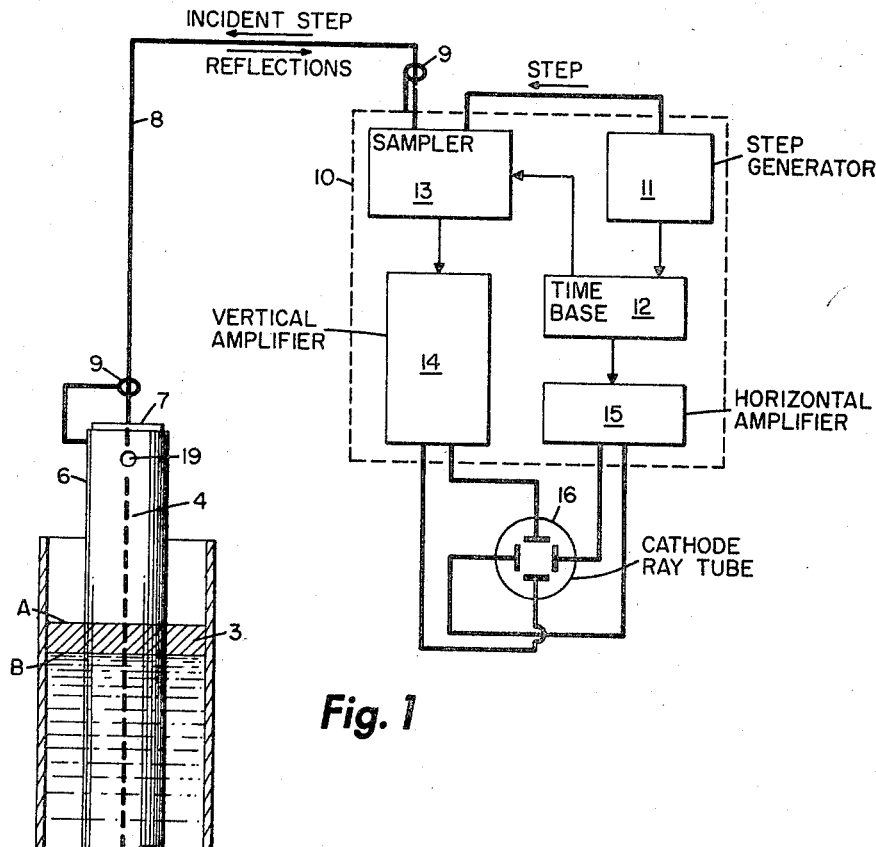
FIGURE 1 is a schematic diagram of a preferred embodiment of the present invention utilizing a sampling type oscilloscope.

In FIGURE 1 a container 1 which may be a decantation column, storage tank or other liquid-containing vessel is principally filled with water 2 on which is floating a thin layer of kerosene 3. A probe 4 consisting of a conducting rod 5 approximately ⅛ inch in diameter of copper or other electrically conducting material, surrounded by a coaxial conducting shield 6 constructed of cooper or other conducting metal and spaced from the rod 5 by a pair of insulating end plugs 7. The two conductors need not be coaxial and may be a pair of parallel wires spaced at, for example, ½ inch. If desirable, the conductors can be insulated without affecting the operation of the apparatus. In other configurations, the tank may form one side of the transmission line. In all cases, at least one conductor of the transmission lines should be substantially surrounded by the fluid, the level which is to be measured. The fluid must be in sufficiently close contact to substantially change the impedance of the transmission line at the point where it is immersed in the fluid. In FIGURE 1, holes 19 allow liquid to move between conductors 5 and 6. "Transmission line," in this application, is intended to mean a transmission line having at least one conductor substantially surrounded by said material so as to isolate it from any other conductor in said transmission line.

A shielded cable connects the exterior portion of the transmission line 6 to the ground of the electronic measuring apparatus to be described hereafter, and connects the central conductor 5 of the transmission line 8, 9 to a signal terminal on a time domain reflectometer 10.

The time domain reflectometer 10 consists of a step generator 11 which is a source of fast-rise voltage steps. This generator can contain a conventional multi-vibrator which drives a pair of tunnel diodes which in turn emit a very fast-rise, essentially square wave signal. For sharpest reflection and most accurate measurement of liquid level, the fastest possible rise time, that is, the most nearly perfect square wave, is preferred. Rise times below about 30 nanoseconds are especially preferred.

Since the steps returning by reflection from points of change of impedance of the transmission line cannot be satisfactorily displayed on conventional oscilloscopes because of the high speed of such signals, the time domain reflectometer 10 includes a sampling circuit 13 which periodically samples the net voltage in the transmission line at a point near the connection to the time domain reflectometer. The sampler consists of an electronic gate actuated by a time base 12 which generates a periodic signal which opens the gate and admits the transmission line voltage to the vertical amplifier 14 of an oscilloscope circuit. The time base 12 generates a "slow ramp" of increasing voltage which, acting through a horizontal amplifier 15 drives the horizontal plates of a conventional cathode ray tube 16 on the oscilloscope. This same "slow rise ramp" also determines the time interval between the generation of a voltage step by the step generator 11 and the sampling of the transmission line by the sampler 13. This time interval is increased so that the voltage in the transmission line is sampled at a series of points which describe a smooth curve across the face of the oscilloscope. Suitable power supplies are provided for the above components. In particular, preferred embodiments the invention comprises apparatus wherein the generated step opens a gate connecting a fixed frequency oscillator to a frequency counter, and wherein the return of the reflected signal closes said gate.

The above electronics are commercially available as the Model 1415A Time Domain Reflectometer manufactured by the Hewlett-Packard Company, 1501 Page Mill Road, Palo Alto, Calif., and described in their brochure 016381, dated 1963. This incorporates the Model 140A Oscilloscope manufactured by the same company.

Other methods for the determination of the time interval between generation of a step and return of the reflected step function can, of course, be utilized including, for example, high-speed oscilloscopes.

The apparatus of the above described preferred embodiment operates as follows.

Step generator 11 produces a voltage step which passes through the transmission line 8 until it reaches a point at which there is a change in the impedance of the line. The first such point is the air-kerosene interface marked A in FIGURE 1. At this point, a portion of the voltage step is reflected back along the line to the time domain reflectometer 10. The remainder of the step voltage continues down the transmission line to point B, the kerosene-water interface where an additional amount of the step voltage is reflected. The remaining step voltage then continues to the end of the transmission line where it encounters a resistive termination matched to the impedance of the transmission line 17.

The time base 12 is activated by the generation of a step voltage and causes the sampler 13 to sample the voltage in the transmission line at a pre-determined interval from the first step generated by the step generator 11. This interval will preferably be extremely short, preferably below about 100 nanoseconds. After the elapse of this time, the time base 12 generates a fast-rising voltage ramp and feeds this ramp to the sampler 13. At the instant when the voltage of the ramp and the voltage in the transmission line coincide, the sampler admits the voltage in the transmission line into the vertical amplifier connected to the cathode ray tube 16. After the second step is generated by the step generator 11, the time interval until the commencement of the generation of the second fast-rising voltage ramp by the time base 12 is slightly longer. This delay is determined by a slow ramp also generated by the time base 12 and this slow ramp is also fed to the horizontal amplifier 15 of the cathode ray tube 16 to provide a horizontal sweep signal. This continuous displacement of a series of points of coincidence between successive ramps and successively sampled transmission line votages forms a continuous curve across the face of the cathode ray tube 16.

Figure 2:
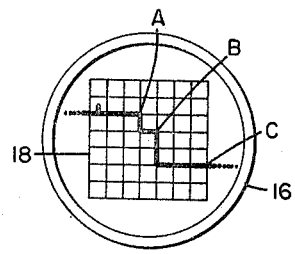
FIGURE 2 is an illustration of a typical oscilloscope display produced by the circuitry of FIGURE 1.

As shown in FIGURE 2, the trace produced on the cathode ray tube by the above described apparatus has a vertical displacement which is proportional to the depth of the various liquid bodies and a horizontal displacement which is proportional to the impedance of the transmission line immersed in each of the bodies. The points marked A, B, and C in FIGURE 2 correspond to liquid interfaces A, B, and C in the container 1.

Figure 3:
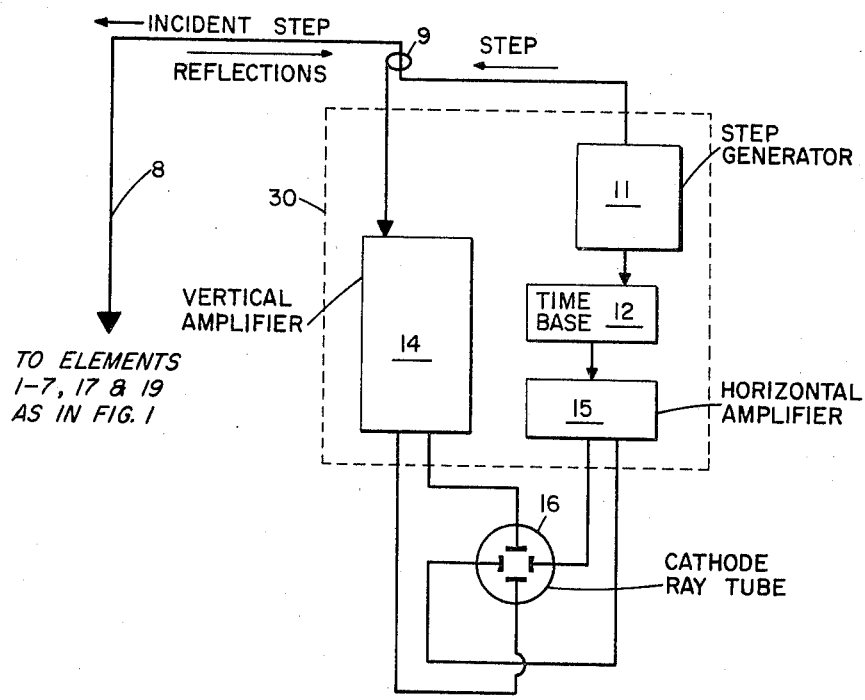
FIGURE 3 is a similar schematic diagram of a preferred high-speed oscilloscope embodiment of the present invention.
Figure 4:
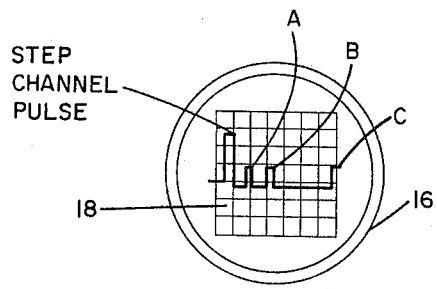
FIGURE 4 is an illustration of a typical oscilloscope display produced by the circuitry of FIGURE 3.

As shown in FIGURES 3 and 4 a high-speed type oscilloscope may be utilized in place of the sampling type oscilloscope shown as element 10 in FIGURE 1. In FIGURE 3 element 30 is a conventional high-speed oscilloscope, e.g. model 180A produced by Hewlett-Packard together with a suitable step generator, all of which are shown as element 30 in FIGURE 3. The external trigger of the sampling oscilloscope is attached to the time base 12 in a conventional manner and the time base is adjusted so that the sweep begins at an appropriate time. As shown in FIGURE 4, the horizontal displacement is then proportional to the depth of the liquid. All of the elements shown in FIGURES 3 and 4 have the same meanings as above described for FIGURES 1 and 2.

The face of the cathode ray tube may be inscribed with a grid 18 graduated in inches of liquid depth in order to permit direct reading of the depth of liquids and the positions of interfaces within the container 1. If desirable, the cathode ray tube may be rotated 90° in order to show the individual steps which represent the various interfaces in their actual vertical relationship.

Figure 5:
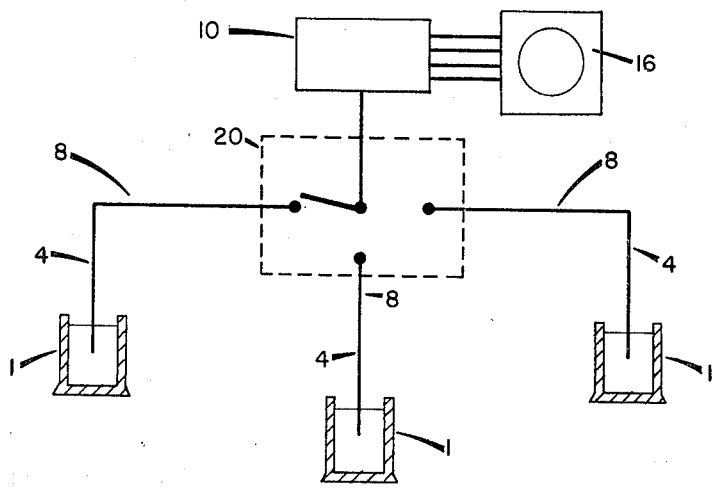
FIGURE 5 is an illustration of a number of probes of the invention connected together by alternate switching means which allows the use of a single oscilloscope and related circuitry.
Figure 6:
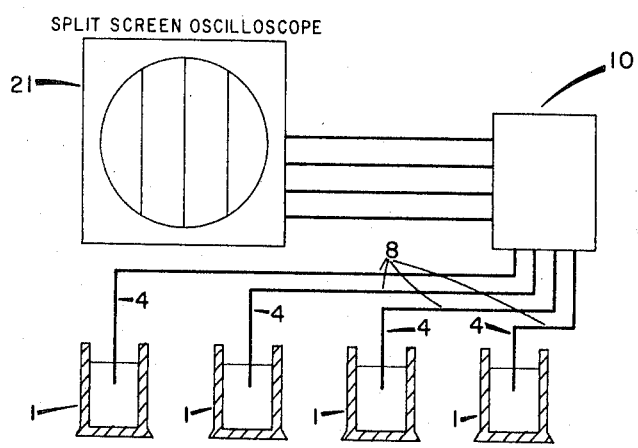
FIGURE 6 is a schematic diagram of a preferred embodiment of the present invention utilizing a split screen oscilloscope to simultaneously read liquid levels in a number of containers.
Figure 7:
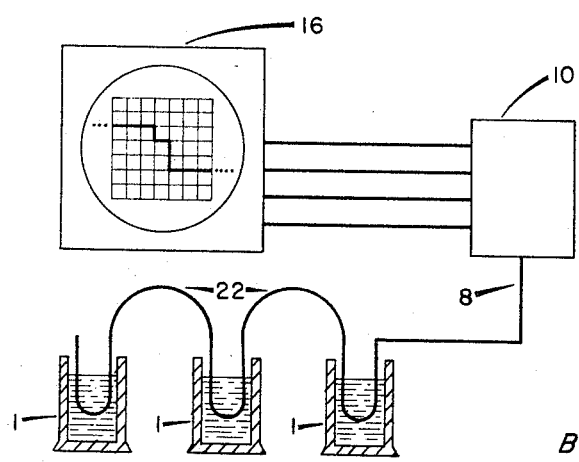
FIGURE 7 is a schematic diagram of a preferred embodiment of the present invention utilizing a single transmission line which passes through interfaces which are located in different containers.
Figure 8:
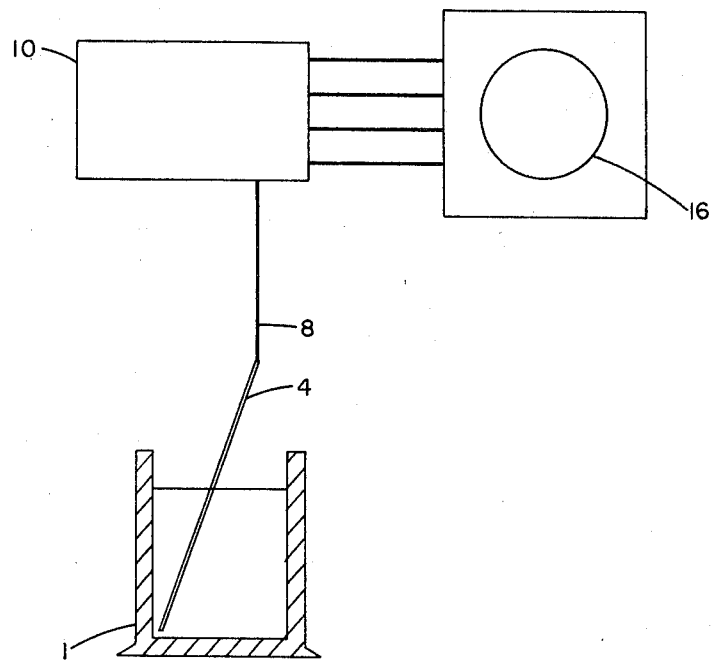
FIGURE 8 is an illustration of a preferred embodiment of the invention in which the probe passes through the interface at an acute angle in order to expand the scale of the read-out device.

A wide variety of modifications of the present invention are possible including, among others, electronic or manual switching for successively connecting various probes located in different tanks to the time domain reflectometer 10, thus permitting the use of a single set of electronic circuitry for the measurement of a number of tanks as shown in FIGURE 5 in which element 20 is a conventional electronic switching means; use of a split oscilloscope screen with electronic switching permitting the simultaneous production of a number of oscilloscope traces showing the liquid levels in a series of tanks as shown in FIGURE 6 in which element 21 is a conventional split screen oscilloscope; and in specialized cases, a number of probes may be connected in series with a special grid over the oscilloscope screen to permit the simultaneous reading of a number of tank liquid levels as shown in FIGURE 7 in which element 22 is a suitable set of probes connected in series. While an oscilloscope has been illustrated in the above preferred embodiment, it should be understood that other readout devices including x-y type plotting devices, and digital readout devices such as conventional frequency counters may be employed where desired. Other particularly preferred embodiments of the invention comprise apparatus for determining the position of an interface between different materials comprising a combination of two or more transmission lines, each passing through a different interface, generating means for generating a fast-rise voltage step which is partially reflected back by a point at which the impedance of said transmission line changes, making a means for measuring the time interval between generation of a given voltage step and return of its reflection, and switching means for connecting said generating means and said measuring means to each of said transmission lines in succession; apparatus of the type described wherein a single transmission line passes through at least two interfaces between different materials especially wherein said material interfaces are contained within a plurality of material containers; an apparatus of the type described wherein the transmission line passes through the interface at an acute angle in order to expand the scale of the read-out device (see FIGURE 8). Similarly, some of the preferred processes of the present invention comprise those wherein a series of separate transmission lines are successively connected to receive such generated fast-rise voltage steps and the time interval for return of reflections from each of said transmission lines is successively measured and displayed on an oscillosocpe.

Other modifications and variations will be apparent to those skilled in the art and it should be understood that

What is claimed is:

1. Apparatus for determining the position of an interface between different materials comprising in combination at least one transmission line passing through said interface, means for generating a fast-rise voltage step which is partially reflected back by any point at which the impedance of said transmission line changes, and means for measuring the time interval between generation of a given voltage step and return of its reflection.

2. The apparatus of claim 1 wherein the means for measuring the time interval between generation of a step and return of its reflection comprises a high speed oscilloscope.

3. The apparatus of claim 1 wherein the generated step opens a gate connecting a fixed frequency oscillator to a frequency counter and wherein the return of the reflected signal closes said gate.

4. Apparatus of claim 1 wherein the means for measuring the time interval between the generation of the voltage step and the return of the reflected step is a time domain reflectometer.

5. The apparatus of claim 1 wherein a single transmission line passes through at least two interfaces between different materials.

6. The apparatus of claim 5 wherein said material interfaces are contained within a plurality of material containers.

7. The apparatus of claim 2 wherein the transmission line passes through the interface at an acute angle in order to expand the scale of the oscilloscope.

8. Apparatus for determining the position of an interface between different materials comprising in combination two or more transmission lines each passing through a different interface generating means for generating a fast-rise voltage step which is partially reflected back by a point at which the impedance of said transmission line changes, measuring means for measuring the time interval between generation of a given voltage step and return of its reflection, and switching means for connecting said generating means and said measuring means to each of said transmission lines in succession.

9. A process for determining the position of an interface comprising generating a fast-rise voltage step in a transmission line passing through said interface, said transmission line having a change in impedance at said interface, and measuring the time interval between generation of a given voltage step and return of its reflection.

10. The process of claim 9 wherein a series of said voltage steps is generated and the time interval for return of reflections is displayed on an oscilloscope.

11. The process of claim 10 wherein a series of separate transmission lines are successively connected to receive said generated fast-rise voltage steps and the time interval for return of reflections from each of said transmission lines is successively measured and displayed on said oscilloscope.

12. The process of claim 11 wherein the oscilloscope is a split screen oscilloscope and there are simultaneously produced a number of oscilloscope traces showing the liquid levels in a plurality of containers.

13. A liquid level gauge comprising a relatively rigid probe for positioning substantially vertically, in a storage tank or other liquid-containing vessel, and comprising the apparatus of claim 8, wherein said rigid probe constitutes the end of one of said transmission lines, and wherein the read out devices are graduated in units indicative of the quantity or depth of liquid contained within said vessel.

14. The device of claim 13 wherein said transmission line consists essentially of said relatively rigid substantially vertical probe which is so designed that the ends of said probe are capable of substantially vertical correlation with the maximum and minimum possible liquid level in said tank.

15. Apparatus for determining the position of an interface between different materials comprising in combination at least one transmission line passing through said interface, means for generating a fast-rise voltage step which is partially reflected back by any point at which the impedance of said transmission line changes, and means for measuring the time interval between generation of a given voltage step and return of its reflection, said means for measuring the time interval comprising a sampling type oscilloscope.

16. The apparatus of claim 15 wherein the sampling device comprises means for generating a series of voltage ramps at spaced intervals across the field of the oscilloscope and means for displaying only the points of coincidence between the voltage ramp and the net voltage in the transmission line.

17. The apparatus of claim 16 wherein a grid is superimposed over said oscilloscope screen, said grid being of such scale as to permit direct reading of the depth of material in a container through which a transmission line passes.

References Cited

UNITED STATES PATENTS

| | | |
|---|---|---|
| 2,525,893 | 10/1950 | Gloess. |
| 2,862,200 | 11/1958 | Shepherd et al. |
| 3,296,862 | 1/1967 | Ziniuk _____ 73—290 |

S. CLEMENT SWISHER, *Primary Examiner.*

W. HENRY, *Assistant Examiner.*